(No Model.)

A. H. & M. G. COLLINS.
SYRINGE.

No. 437,481. Patented Sept. 30, 1890.

WITNESSES:
P. H. Eagle.
L. Douville.

INVENTORS
Annie H. Collins.
Matthew G. Collins.
BY
ATTORNEY.

UNITED STATES PATENT OFFICE.

ANNIE H. COLLINS AND MATTHEW G. COLLINS, OF CAMDEN, NEW JERSEY.

SYRINGE.

SPECIFICATION forming part of Letters Patent No. 437,481, dated September 30, 1890.

Application filed April 3, 1890. Serial No. 346,380. (No model.)

*To all whom it may concern:*

Be it known that we, ANNIE H. COLLINS and MATTHEW G. COLLINS, citizens of the United States, residing in the city and county of Camden, State of New Jersey, have invented a new and useful Improvement in Syringes, which improvement is fully set forth in the following specification and accompanying drawings.

Our invention consists of improvements in a syringe adapted to be adjusted as to the degree of penetration so that its head may most readily reach a desired locality, the construction being hereinafter fully set forth, and the novel features of the same definitely claimed.

It also consists in providing a syringe with a folding handle.

Figure 1:
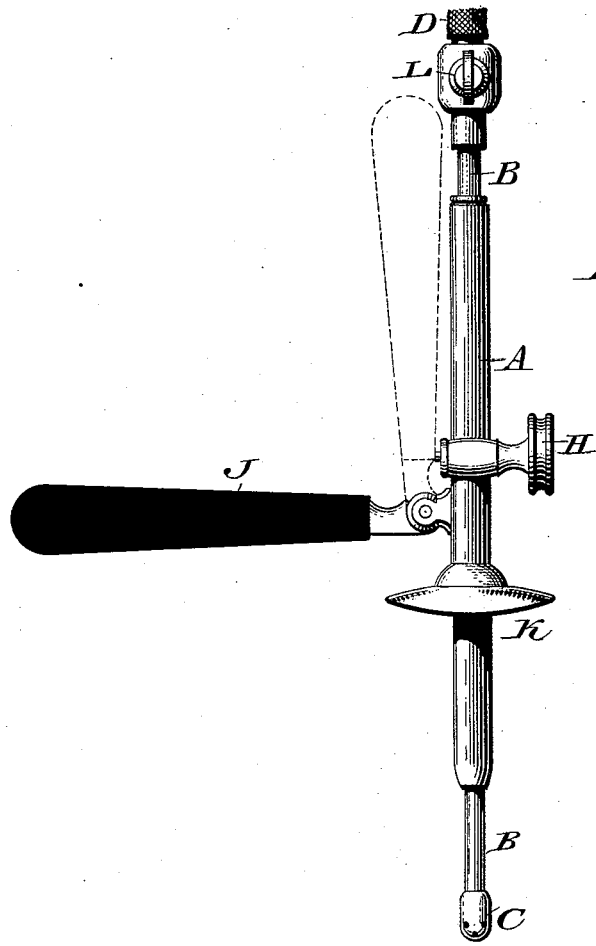
Figure 4:
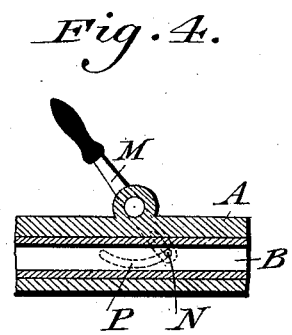
Figure 2:
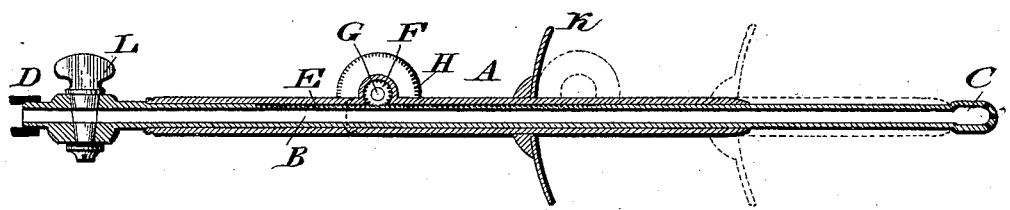
Figure 3:
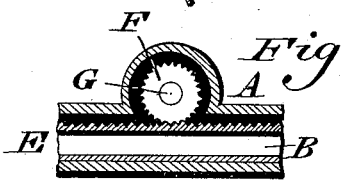

Figure 1 represents a top or plan view of a syringe embodying our invention. Fig. 2 represents a longitudinal section thereof. Fig. 3 represents an enlarged view of a portion of Fig. 2. Fig. 4 represents a section of a modification.

Similar letters of reference indicate corresponding parts in the several figures.

Referring to the drawings, A designates a sleeve or tube within which is telescopically or movable fitted a pipe B, one end of which latter is provided with a perforated head or nozzle C, and the other end is adapted to have connected with it a piece of suitable tubing D for supplying said pipe B with water or other fluid, it being noticed that the pipe is considerably longer than the sleeve.

On the periphery of the pipe is a rack E, with which meshes a pinion F, the latter being connected with a shaft G, whose bearings are on the sleeve A, and which is provided with a wheel or head H, whereby said shaft, and consequently the pinion, may be readily rotated, and the pipe accordingly moved in opposite directions.

Connected with the sleeve is the handle J, which is pivoted to said sleeve, whereby it may be set out angularly therefrom so as to hold the syringe while in operation, or folded against or toward the sleeve, as shown by the dotted lines, Fig. 1—a matter of convenience when the syringe is not in use, when it may be placed in a box, wrapping, &c.

The sleeve A is provided with a guard K and the pipe B with a stop-cock L, both for evident purposes.

It will be seen that when the handle J is grasped the head end of the pipe may be inserted in the vagina, anus, or other locality, limited by the guard, and the pinion is then rotated, whereby the pipe may be gently and gradually moved until the head C reaches the desired spot. The cock L is opened and the fluid thus admitted into the pipe and is injected or sprayed therefrom through the head, thus acting upon surrounding objects. When the operation is accomplished, the supply of fluid is cut off, when the pipe may be withdrawn by proper operation of the pinion F and the syringe fully removed from the place of service.

We do not limit ourselves to the rack and pinion as means for moving or adjusting the pipe B, as other devices may be employed therefor, as in Fig. 4, where a lever M is employed, the same being mounted on the sleeve A and engaging with the pipe B by a pin N, which latter passes through a slot P in said sleeve, and is secured to said lever M and pipe B so that by the operation of the lever movement may be imparted to the pipe in opposite directions.

Having thus described our invention, what we claim as new, and desire to secure by Letters Patent, is—

1. A syringe having a pipe which is telescopically fitted in a support and provided with a rack and pinion adapted to move said pipe in opposite directions for adjusting the head of the same relatively to the place of service, substantially as described.

2. A syringe having a folding handle connected therewith, substantially as described.

3. A syringe having an adjustable pipe and a support for the same, said support carrying a guard, a handle, and means for operating said pipe, substantially as described.

4. A syringe having an adjustable pipe provided with a rack, a support for said pipe, carrying a pinion which engages with said rack, a guard, and a handle, substantially as described.

5. A syringe having an adjustable pipe provided with a rack, a support for said pipe, carrying a pinion which engages with said rack, and a handle which is pivoted to said support, substantially as described.

To the above we have signed our names this 18th day of February, A. D. 1890.

ANNIE H. COLLINS.
MATTHEW G. COLLINS.

In presence of—
GRANT STOCKHAM,
WM. P. MANSFIELD.